United States Patent [19]

Ivarson

[11] 4,329,066

[45] May 11, 1982

[54] METHOD AND APPARATUS FOR CONTINUOUSLY MIXING A LIQUID AND POWDER

[76] Inventor: Nemo Ivarson, Skönviksvägen 253, S-122 42 Enskede, Sweden

[21] Appl. No.: 189,164

[22] Filed: Sep. 22, 1980

[51] Int. Cl.$^3$ .............................................. G01F 15/02

[52] U.S. Cl. ..................................... 366/150; 366/155

[58] Field of Search ............... 366/150, 155, 241, 118, 366/242, 182, 244, 272, 263, 265, 279, 282, 341, 302

[56] References Cited

U.S. PATENT DOCUMENTS 3,163,402 12/1964 Yamashita ....................... 366/150 X 3,355,106 11/1967 Graham .......................... 366/155 X

FOREIGN PATENT DOCUMENTS 703282 2/1941 Fed. Rep. of Germany ...... 366/265

*Primary Examiner*—Edward J. McCarthy

*Attorney, Agent, or Firm*—Larson and Taylor

[57] ABSTRACT

A method and apparatus for continuously mixing a liquid and a powder to form a substantially homogenous mixture. The liquid and powder are fed, via separate lines (22,21) to a cavity (7) in a rotating wheel (3,4) and to powder-accommodating spaces (13) respectively in said rotating wheel (3,4) and are thrown therefrom by centrifugal force outwardly towards the periphery of the wheel. The liquid is pressed from the cavity (7) via a gap (8,9) arranged in the wheel in a direction towards the upper side of said wheel and forms a mist curtain as it exits from the gap. The mist curtain captures the powder particles thrown by centrifugal force from the powder-accommodating spaces (13) and is mixed with said particles.

4 Claims, 3 Drawing Figures

METHOD AND APPARATUS FOR CONTINUOUSLY MIXING A LIQUID AND POWDER

The present invention relates to a method and apparatus for continuously mixing liquid and powder to a substantially homogenous mixture. The apparatus comprises a mixture having a mixer housing and individual lines for supplying liquid and powder respectively to said apparatus.

In known methods of mixing a liquid with a powder, the liquid and powder are often kneaded together. Such methods, however, often result in the formation of lumps and agglomerates which is highly undesirable. It is often necessary to wet-grind the mixture in order to obtain the desired structure. When producing readily flowable mixtures, a further problem arises, namely that the internal friction in the mixture is so low that it is often impossible to avoid the formation of agglomerates, meaning that the lumps thus formed must be filtered off at a later stage.

The object of the present invention is to avoid the aforementioned problems when preparing mixtures of liquid and powder. Accordingly, the method according to the present invention is mainly characterized in that the liquid and the powder are charged respectively, by separate lines, to a cavity arranged in a rotatable wheel and to powder spaces also arranged in said wheel, so as to be thrown by centrifugal force outwardly towards the periphery of said wheel, whereat the liquid is urged from said cavity, via a gap in said wheel, towards the upper side of said wheel and forms a mist curtain at the exit of said gap, at which location the powder grains or particles thrown from said cavity by said centrifugal force are captured in said mist curtain and mixed therewith. The apparatus according to the invention is characterized in that the mixer housing includes a wheel arranged for rotation about a shaft in the mixer housing, whereat the line through which the liquid passes discharges into a cavity in the wheel, while the line through which the powder passes discharges into spaces in the upper part of said wheel, and the cavity communicates with said upper side of said wheel via a circumferentially extending gap having a configuration substantially corresponding to the configuration of the outer surface of a truncated cone, with the apex of said cone directed downwardly.

One advantage afforded by means of the invention is that the amount of powder and the amount of liquid fed to the apparatus can be held constant during the whole of the mixing operation, which is extremely important, for example, when preparing mixtures within the medical industry. The ratio of powder to liquid can be set to any desired value for each particular mixture. Moreover, the apparatus according to the invention operates continuously, as opposed to known apparatus where one "lump of dough" is mixed at a time, for example, in a so-called "batching".

The invention will now be described in more detail with reference to the accompanying drawing, which illustrates schematically an embodiment of an apparatus according to the invention.

Thus, FIG. 1 is a vertical sectional view of an apparatus according to the invention.

Figure 1:
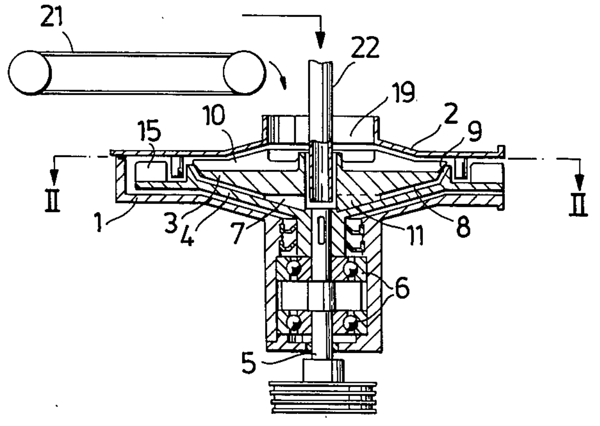
Figure 2:
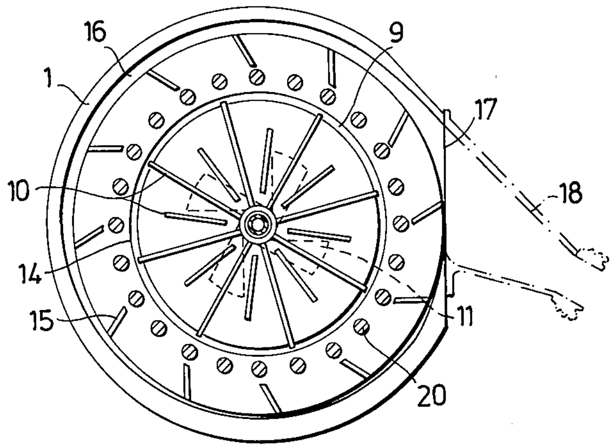
FIG. 2 is a sectional view taken on the line II—II of FIG. 1.
Figure 3:
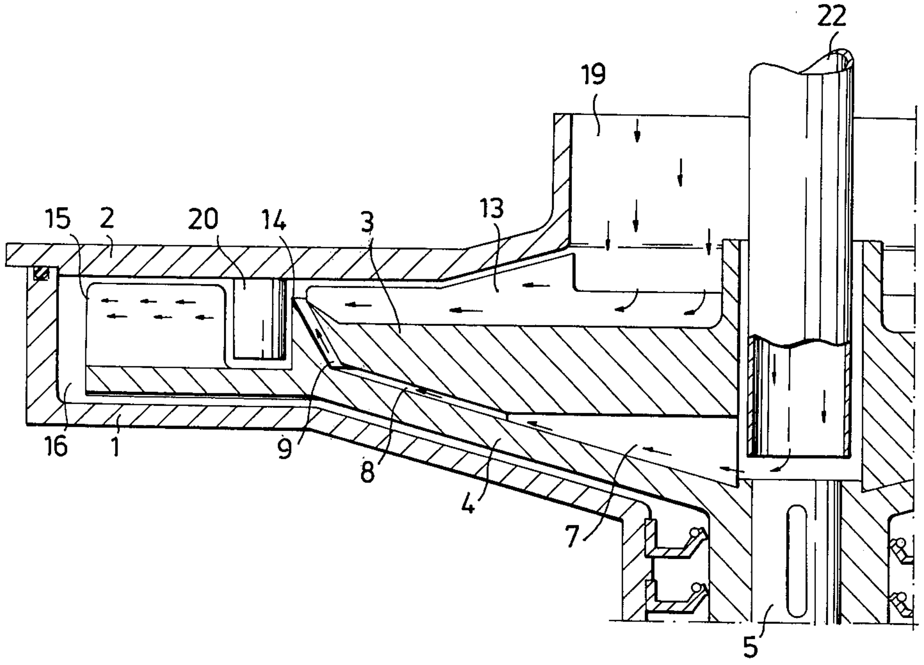
FIG. 3 is a part of the vertical sectional view of FIG. 1 shown in larger scale. Similar elements in the various views of the drawing have been identified by the same references.

The apparatus illustrated in the drawing comprises a mixer housing 1 having a lid or cover 2. Arranged within the housing 1 is a wheel arrangement comprising an upper wheel 3 and a lower wheel 4 which is rotatably mounted on a shaft 5 by means of bearings 6. Located beneath the upper and the lower wheels 3 and 4 respectively is a cavity 7 which communicates with the upper side of the upper wheel 3 via a circumferentialy extending gap defined by the outer surfaces 8 and 9 respectively of frusto-conical elements, with the apexes of said elements directed downwardly. Milled on the upper surface of the upper wheel 3 are blades 10, while blades 11 are milled on the lower surface of said upper wheel 3. Arranged between the blades 10 are spaces 13 which are intended to receive the powder to be mixed with said liquid, while the cavity 7, which is divided into compartments by means of the blades 11, is intended to receive the liquid to be mixed with said powder. The lower wheel 4 has a circumferentially extending edge 14 located adjacent the mouth of the gap 9. The lower wheel 4 is provided around its periphery with blades 15 for throwing out the powder and liquid mixture via a diffusor 16 and an outlet 17. The outlet may optionally be supplemented with a nozzle 18 which is used when the finished mixture is more flowable. The lid or cover 2 has a compartment 19 located above the centre of the wheel arrangement for receiving the powder phase, for further transport of said powder phase to the spaces 13. The lid is also provided on the undersurface thereof with pins 20 which lie adjacent the edge 14. The powder phase is fed to said compartment or space 19 with the aid of a transporter 21, for example a feed screw. The liquid phase is passed to the cavity 7 through a pipe 22.

When the apparatus is in operation, the wheels 3,4 of the wheel arrangement located within the housing 1,2 rotate about the shaft 5 at a speed which may lie between 1000 and 5000 rpm. The wet phase, or the liquid, is passed to the mixer via the pipe 22, to the cavity 7. As a result of the centrifugal force, and with the aid of the blades 11, the liquid is thrown outwardly through the gap 8 and further through the gap 9. The liquid thus obtains the form of a skin which extends constantly outwardly while becoming thinner and thinner. When the liquid skin leaves the gap 9 it strikes the edge 14 and is broken up into microscopic droplets so as to form a curtain. At the same time as liquid is supplied through the pipe 22, powder is supplied by the conveyor 21 to the compartment 19 and further to the spaces 13. The powder is thrown from the spaces 13, with the aid of centrifugal force and the blades 10, outwardly towards the periphery of the upper wheel 3, at the same time as said powder is whipped up and impinges on the curtain of liquid at the edge 14. The two phases, liquid and powder, are now thrown outwardly together and collide with pins 20, where the instantaneous mixture of powder and liquid takes place. The finished mixture is caught immediately by the blades 15 and is thrown outwardly via the diffusor 16 to the outlet 17. Granulates and stiff mixtures leave the mixer at the outlet 17. while the readily flowable mixture is taken out via the nozzle 18.

The invention is not restricted to the described embodiment, but can be modified within the scope of the accompanying claims. Particular note should be taken to the expressions "cavity" and "powder spaces", since "a cavity" can in principle be said to comprise "a plurality of cavities" while "powder spaces" can be well said to be "a powder space".

I claim:

1. An apparatus for continuously mixing liquid and powder together to form a substantially homogenous mixture, comprising; a mixer and a mixer housing, separate lines for supplying liquid and powder, the mixer housing comprising a wheel arrangement arranged for rotation on a shaft in the mixer housing, whereat the liquid discharges into a cavity in the wheel while the powder line discharges into powder-accommodating spaces in the upper part of the wheel, and the cavity communicating with the upper side of said wheel via a circumferentially extending gap which opens out adjacent a circumferentially extending edge located on the peripheral side of the gap, the shape of the gap corresponding substantially to the shape of the outer surface of a truncated cone with the apex of said cone facing downwardly, and the mixer housing including mixer pins arranged to capture liquid from the mist curtain and the powder thrown out by centrifugal force from the powder spaces, to provide said misture.

2. An apparatus according to claim 1, characterized in that the powder spaces in the upper part of the wheel arrangement are separated from one another by means of blades which are directed outwardly from the centre of the wheel.

3. An apparatus according to claim 1 or claim 2, characterized in that the cavity, which is located around the centre of the wheel arrangement, is divided into different compartments by means of blades directed outwardly from the centre of said wheel.

4. An apparatus according to any one of claims 1 or 2, characterized in that the conical gap has a lower and an upper conical part, of which conical parts the apex angle of the lower part is more obtuse than the apex angle of the upper part.

* * * * *